United States Patent [19]

Howard

[11] 4,256,704
[45] Mar. 17, 1981

[54] HYDROMETALLURGICAL PROCESS FOR THE RECOVERY OF SILVER AS SILVER HALIDE OR SILVER PSEUDOHALIDE FROM WASTE PHOTOGRAPHIC PAPER AND FILM AND OTHER SENSITIZED MATERIALS

[76] Inventor: Michael S. Howard, c/o Literature Search Services, P.O. Box 24 084, Tel Aviv, Israel

[21] Appl. No.: 35,532

[22] Filed: May 3, 1979

[51] Int. Cl.$^3$ .......................... C01G 5/02; C01C 3/20
[52] U.S. Cl. ...................................... 423/27; 423/32; 423/34; 423/38; 423/366; 423/491; 75/118 P
[58] Field of Search .................. 75/118 P; 423/27, 29, 423/32, 33, 34, 38, 364, 366, 491, 94, 98, 103, 109, 87, 131

[56] References Cited

U.S. PATENT DOCUMENTS

| | | | |
|---|---|---|---|
| 1,477,321 | 12/1923 | Darling | 423/87 |
| 1,582,847 | 4/1926 | MacDonald | 423/38 |
| 1,998,010 | 4/1935 | Girvin | 423/34 |
| 2,273,569 | 2/1942 | Goette | 75/118 P |
| 2,304,823 | 12/1942 | Harrison | 423/34 |
| 3,649,250 | 3/1972 | Dorenfeld | 75/118 P |
| 3,733,256 | 5/1973 | Anderson | 75/118 P |
| 3,793,168 | 2/1974 | Lilly | 75/118 P |
| 3,957,505 | 5/1976 | Homick | 423/38 |
| 4,078,918 | 3/1978 | Perman | 75/118 P |
| 4,131,454 | 12/1978 | Piret | 423/38 |
| 4,153,462 | 5/1979 | Gerber | 423/34 |

FOREIGN PATENT DOCUMENTS

| | | |
|---|---|---|
| 633685 | 2/1978 | France . |
| 205984 | 11/1923 | United Kingdom . |
| 205985 | 11/1923 | United Kingdom . |
| 237939 | 8/1925 | United Kingdom . |

OTHER PUBLICATIONS

*Chemical Abstracts,* vol. 78, #60867h, (1973), Abstract of Hungarian Pat. 162,971.
*Chemical Abstracts,* vol. 56, #4438b, (1962), Abstract of Spanish Pat. 261,174.
*Chemical Abstracts,* vol. 56, #9493c, (1962).
*Canadian Journal of Chemistry,* vol. 40, (1962), pp. 76, 77.
*Chemical Abstracts,* vol. 77, #54889e, (1972).
*Acta. Chem. Scand.,* 10, (1956), No. 5, pp. 816–819.
*Journal of the American Chemical Society,* vol. 33, (1911), pp. 1940, 1941.
*Research Disclosure,* Nov. 1976, p. 49.
Natvanovich et al. "Extraction of Inorganic Salts by Thiocyanates of Organic Bases", *J. Gen. Chem. USSR,* 47, (3), (1977), p. 496.
Caley et al, "Detection and Separation of Difficultly Soluble Compounds by Concentrated Hydriodic Acid", *Ind. and Eng. Chem., Anal. Ed.* 8, (1936), pp. 63–67.
*Arkiv for Kemi,* vol. 12, No. 23, (1958), pp. 228, 229.
*Analysis of Ancient Metals,* New York, (1964), pp. 66–71.
Kulba et al "Effect of Cations of the Alkali Metals on the Composition and Stability of [Ti(CNS)n]$^{i-n}$ Ions", *Russ. J. Inorg. Chem.* 5, (1960), p. 138.
Mironov, "Solubility of Silver Halides and Thallium (I) Iodide in Aqueous Solutions of Similar Alkali Metal Salts", *Russ. J. Inorg. Chem,* 7 (1962), p. 1366.

*Primary Examiner*—Brian E. Hearn

[57] ABSTRACT

The invention provides a process for the recovery of transition and post-transition metals the halides and pseudohalides of which are hyperlinearly soluble in excess halide or pseudohalide, and especially of silver as halide or pseudohalide from waste photographic paper, photographic film, and other sensitized materials. The process comprises washing the material, removing wash, bringing the silver present to a form solubilizable in concentrated halide or pseudohalide solution, by oxidation if necessary, dissolving the silver salt or salts by means of a concentrated reagent solution of the halide or pseudohalide of an alkali or alkaline-earth metal, or ammonium, separating said complex solution from solid matter, washing the solid in turn with a dilute solution of the halide or pseudohalide and then with water, treating said separated complex solution with said dilute halide or pseudohalide wash and water-wash combined to form a precipitate and separating the precipitate of said silver halide or pseudohalide, reconcentrating dilute reagent, separating unwanted, accumulated salts from reagent and purifying silver salt.

21 Claims, No Drawings

HYDROMETALLURGICAL PROCESS FOR THE RECOVERY OF SILVER AS SILVER HALIDE OR SILVER PSEUDOHALIDE FROM WASTE PHOTOGRAPHIC PAPER AND FILM AND OTHER SENSITIZED MATERIALS

The present invention relates to the application of the known property of certain halides and pseudohalides of silver, although insoluble or sparingly soluble in pure water, to dissolve to a lesser or greater extent in concentrated aqueous halide and pseudohalide solutions forming halo- or pseudohaloargentates, e.g., $$mAgI + nKI \rightarrow nK^+ + Ag_mI_{m+n}^{(-n)} \tag{1}$$

where, for each different combination of integers m and n which are applicable, there exists a separate species, and an equilibrium constant $K_{m,n}$ unique for that species. Different amounts of every existing species coexist in any complex solution, the relative amounts being governed by the Law of Mass Action $$[Ag_mI_{m+n}^{(-n)}] = K_{m,n}[I^-]^n, \tag{2}$$

where [I] is the free iodide-ion concentration (as opposed to total iodide, since some of the total iodide has been included in the iodoargentate complexes), it also being understood that correction for changes in activites of the various species, due to various factors, has been considered.

So, it may be shown that the total silver concentration, i.e., the solubility, is simply the sum over m and n of all the species ×m, $$L_{AgI} = sum(m \times K_{m,n} \times [I^-]^n); \tag{3}$$

therefore, it is obvious that $L_{AgI}$ will increase non-linearly with iodide concentration; conversely, a relatively small dilution of a concentrated complex solution will precipitate most of the complexly-dissolved silver halide.

All the above facilitates the separation and recovery of silver, by, and in the form of halides or pseudohalides, e.g., $I^-$, $Br^-$, or $SCN^-$, from photographic and other wastes, where the metal or its compounds are dispersed. In all these applications, if the Ag appears in elemental form, it must be oxidized to a form which the above-mentioned complexing agent will solubilize and react with; this may be accomplished with acid treatment in most cases, as will be described.

PREVIOUS ART

The use of concentrated aqueous solutions of $I^-$, $Br^-$, or $SCN^-$ for the recovery of silver, or, for that matter, similar transition or post-transition metals, e.g., Pb, Cu, Hg, Bi, Au, and Tl, has not been found in the Art of extractive metallurgy. The use of concentrated brine, with or without $CaCl_2$ for Ag, Cu, etc. leaching is very well known in the Art. In British Pat. No. 237,939 we find the oxidation of various Ag and Pb ores, followed by the lixiviation with concentrated NaCl, $CaCl_2$, or other $Cl^-$. However, the inventor specifically states in claim 5 that "ores ... of Pb and Ag in too concentrated a form are mixed with inert substances ...," meaning that this method can not treat moderately concentrated materials. This is further verified in Iz. ANKAZSSR, Ser. Met. Ob. i Og. 1961, No. 2, 85–90 (CA 56, 9493c), where mention is made that even hot, concentrated $NH_4Cl$ will dissolve no more than 3–4 g Ag/L. (See also JACS 33, 1937 (1911).)

The use of complex formation for metal separation and recovery through solvent extraction is very well known in the Art now. Very recently (Research Disclosure No. 151, p. 49, Nov. 1976), Ag recovery as $I^-$ complex from green (unexposed) photographic wastes was proposed by B. C. Telford of Kodak. In his proposal, as given in an example, HI, KI, and acetonitrile—$H_2O$ are used. Besides the waste of much HI by its combining with the gelatin present, and besides the use of unwieldly nitriles in his method, I present a method which bypasses the very need for solvent extraction, by *direct aqueous* recovery of the Ag as complex and its dilution and destruction (stripping) in purely aqueous form. It should be noted that solvent extraction is a much broader method than my proposed one, in that any complex which is preferentially partitioned to the non-aqueous solvent is usuable, whereas in my method only those particular types of complexes defined above are usable.

It is interesting to note that the advantage of keeping the complexing agent in one phase has been noted (J. Gen. Chem. USSR 47, No. 3, pp. 540–5, Mar. 1977), where the thiocyanate of an organic base in toluene carrier extracts various metals from aqueous solution.

Caley used concentrated HI, and later, saturated $NH_4I$ solution as a general quantitative reagent for determination of various metals, including Ag (Ind. Eng. Chem., Anal. Ed. 8, 63–7 (1936); "Analysis of Ancient Metals," p. 67, New York (1964). However, as mentioned above, HI would be wasted by side reactions. Also, he uses a great excess of each reagent, which would be uneconomical for recovery purposes. The use of $Br^-$ or $SCN^-$ are not mentioned there. In my method, the various factors influencing optimum reagent concentration will be treated below. Finally, U.S. Pat. No. 1,998,010 describes a process of purifying AgI obtained as an intermediate, in, inter alia, $I_2$ recovery from oil-well brines by dissolving in conc. $I^-$, filtering from impurities, diluting, and separating by filtration; however, there the case is one of an AgI precipitate, while here there is a dispersion of AgBr+AgCl, with perhaps a little AgI, the former which must be converted to AgI, in the emulsion gelatin. Also, here other reagents ($Br^-$, $SCN^-$) are also used.

PROCEDURE (1) Solubility Influencing Factors

The solubility of the complex silver halides or pseudohalides is a complex function of temperature, ionic strength, identity of "inert" salts present, especially the cation, which is the counterion of the complex anion (see Mironov, Russian J. Inorg. Chem. 7, 1366 (1962) and ibid., 5, 138 (1960)), and, of course, the (free) ligand concentration. In general, it may be stated that, up to a point, the complex solubility increases exponentially with the increasing ligand concentration; increases linearly with the ionic crystal radius of the "inert" cation (e.g., KI should, up to a point, dissolve roughly 1.33/0.99 = 1.34 times the amount of AgI that a similar solution of NaI would); increases with total ionic strength. It almost always increases, sometimes greatly, with temperature more or less according to the known isochore relationship. After a certain point, however, various opposing effects can occur:

(a) for very concentrated complex solutions double salts containing the desired metal may precipitate out of solution;

(b) the rate of the exponential increase in solubility with ligand concentration decreases;

(c) there is a reversal in the effect of the "inert" cations (see Mironov, ibid.), and the Li or Na salt of the ligand is a better/or as good a solvent for the metal halide or pseudohalide than the potassium or ammonium salt of the ligand would be (ammonium is usually a slightly better choice of cation for a given ligand).

(d) according to equ. (3) above, the solubility is a function of ionic strength in that both the equilibrium constant for each species, and the activity factors for free iodide ion change with ionic strength, and this, differently for each concentration of different sets of salts of cations and ligands. Therefore, there can also be a reversal because of changing activity factors: in general, the relationship is complex.

In this regard it should be noted that according to my proposed method as described, there will be an accumulation of certain amounts of salts caused by acid-base neutralization, when applicable, which, because of the above, will change the solubility, by changing the activity factors (changed total ionic strength); therefore, it is desireable to control and limit the accumulation of said salts as much as is possible, as will be described;

(e) finally, the interesting effect of the enhanced solubility of some ligand-containing salts should be mentioned: in very concentrated complex solutions (e.g., $KI + AgI$), because of the withdrawal of iodie ion to the complex (since n in equ. (1) increases with iodide concentration; see Leden, Acta Chem. Scand., 10, 812 (1956)), so that the solubility product of KI is not exceeded, and the solution is "supersaturated" with the KI. A similar mutual solubility effect has already been noted with the system $BeSO_4$—$BeO$—$H_2O$.

(2) Description of Process of Invention

Except for the case of a mixture of the silver salt with some other material, as in green photographic materials, the metal will usually be in the form of the element, e.g., silver dispersed on exposed photographic paper or film, specifically, in the gelatin layer.

According to this process, the silver must be brought into a form which will be soluble as a complex in the solution finally used to recover it. To this end, the volume of the original mixture is first reduced as much as possible, e.g., by burning photographic paper or film, or sensitized copying papers, or any mixture thereof. Also, the gelatin containing Ag may be stripped, e.g., by conc. NaOH solution, e.g., in Fr. Pat. No. 633685, then dried, washed, and burned, as above. Then the Ag is oxidized, e.g. by "acid curing," with the minimum amount of a concentrated acid, e.g., $HNO_3$ or $H_2SO_4$; if it is possible to use dilute acid, this is preferable, so as to minimize extraneous salt content, as mentioned. (To this end, also, the abovementioned ash should be washed and drained of liquid before the acid treatment. The use of suction will help removal of excess water.) Heat is often needed in acid treatment. The excess acid is neutralized with minimum base having the same cation as the complexing salt to be used.

Knowing the approximate concentration of the silver, and other salts present, e.g., from the above-mentioned neutralization, and the temperature of the mixture, it is possible to calculate the minimum volume of the highest concentration of ligand usable, considering also mixing facility. As may be shown, using the highest possible original reagent concentration (on the condition that the solubility of the metal complex is hyperlinear, i.e., exponential, in this concentration range of reagent) will result in the lowest final volume when the complex-carrying reagent is later diluted, as will be explained below. This is important economically, as the reconcentration of the diluted reagent, after removal of the precipitated metal salt, is by evaporation, and it is desired to evaporate the smallest volume possible. To the above amount of ligand must be added the stoichiometric equivalent of the silver, to convert the solubilized silver to the iodide; a 5–10% excess of the above volume should be added, because of uncertainties in silver content, to ensure complete solubility. The mixture is mixed by means known in the Art, and the liquid is separated by vacuum filtration, centrifugation, or any other means known. It may be necessary to filter the filtrate/centrifugate through activated charcoal.

On the basis of the amount of complex solution still retained by the material remaining after filtration, centrifugation or other means, the minimum volume of the reagent, at the lowest concentration which will just keep the complex remaining in the material in solution, is added to wash the remaining complex, and other salts, out of said material. It is possible to break this wash up into small portions, applying vacuum, or other means, after each portion, for more efficient washing. A second, final wash of pure water is added, the volume of which is determined by the remainder of salts in the material, or the desired final concentration of the reagent, to which the two above-mentioned washes will be added, whichever determined volume is greater.

Both washes, or the first and part of the second, which had also been separated by filtration, etc., and filtered, if necessary via activated charcoal, are added to the solution of Ag complex, whereupon most of the Ag precipitates out as the insoluble, or sparingly soluble salt of the ligand, which is separated by known means. Some Ag always remains in complex solution.

The desired final concentration of the reagent will be determined by considering the economic trade-off between the greater energy which will be needed to reconcentrate the reagent by evaporation, in the case of greater dilutions, v.s. the incomplete stripping of the Ag salt from the reagent by the lesser dilution, which will lower its solvent power for the following material treatment, so that a unit volume will treat less material, with the same time, equipment, and work.

It is also possible to pass the reagent having low Ag-complex content, i.e., after dilution, through an ion-exchange column to strip it of said complex.

The precipitated metal salt may be purified any number of times by redissolving in concentrated ligand solution, and reprecipitation. For example, AgI dissolves to an extent of 5.68 M/original L 8.46 M HI (25° C.), which latter may be recovered as the azeotrope after dilution and precipitation of the AgI; 4.27 M/7.95 M LiI (25°); 4.63 M/8.55 M NaI (30°); 4.14 M/6.26 M KI (30°). The pure AgI, for example, may be used for weather modification, in temperature-indicating pigments, or in the form of compounds $MAg_4I_5$, where M=metal or $NH_4^+$, in batteries, or reduced to the metal, by known means.

When the silver is originally present as the salt, e.g., in green photographic materials, there may not be a need to burn the supporting substance, e.g., paper or film, but to directly contact the material with the concentrated reagent. Burning may be used, however, when applicable, if it is not desired to recover the paper or film base.

When possible, the material should be washed to remove soluble salts, but not the desired metal, and the wash removed as thoroughly as possible, as mentioned above.

Factors such as diffusion must be taken into consideration: photographic paper and the gelatin layer absorb almost immediately, whereas the cellulose acetate base of film takes a few hours to completely absorb the reagent, so that the film should be washed immediately after being contacted with the reagent, while there is no difference for the paper.

In the case of some voluminous materials, such as some low-silver content green photographic wastes, there is a volume problem, in that the complexing power of a given volume of reagent may be adequate to treat all the silver salt, but the large volume of the material makes it necessary to divide the material into batches, when the materal volume (area x thickness, for photographic paper, for example) exceeds a certain % of the reagent volume which could treat it. Alternatively, it is possible to use a larger volume of less-concentrated reagent; here, there is a trade-off between the final volume, and the number of batches per weight (silver content) of material. The material may be contacted with the reagent by dipping each batch into it when the batch is suspended in a net; or by having the reagent flow from container to container, possibly by gravitational force, etc. Agitation is used in all cases, including the abovementioned ash treatment. Elemental Ag separating from green sensitized materials may be separated by filtration. As with treatment of materials after the "acid cure," here too an excess reagent should be used when the amount of metal and/or ionic strength is not known for sure. Then too, with green materials, carryout of solution slightly lowers the reagent concentration for the last batches. Although the silver complexes are light-stable, as are their complex solutions, many of the original salts are characterized by their decomposition in light, so that safe-light conditions should be used when necessary.

After the reagent has been reconcentrated by evaporation, which should be done by a combination of heat and vacuum, to reduce the corrosion of the evaporating vessels, a stoichiometric amount of ligand is added for the conversion of the next cycle of material.

When the reagent solution has become contaminated with an excess of salts, from acid neutralization, conversion of silver to ligand salt, etc., which interfere with the process outlined above, it is necessary to remove the unwanted salts by fractional crystallization. The complex silver remaining in the solution may be removed first, e.g., by passing through an ion-exchange column.

As is obvious, the recovered reagent (ligand salt) need not be 100% pure. It is possible to burn off organic material from some reagents used in this method, if necessary. In further purifications of the silver salt, the degree of purity of the reagent will depend on the purity desired.

(3) Choice of Ligand, Cation, and Acid

This proposed method presents a very wide variety of possibilities for silver recovery as regards form of recovered salt; concentration of silver in material treated; purification of salt recovered. According to equ. (2), for different ligands at the same concentration of free ligand (and the same activity), the concentration of each species is a function of the equilibrium constant's numerical value; also, for each ligand, the set of values m and n that are applicable to that ligand are different than that set applicable to other ligands. From this, and equ. (3), it is seen that the solubilities of the ligand salts of the same metal in excess ligand solution will differ from ligand to ligand. In general, the more stable the compound (e.g., AgSCN), the more soluble as complex.

Therefore, at moderate concentrations, the solubility rises from $Br^-$ to $I^-$ to $SCN^-$. (The effect of the cation has been mentioned above.) 6.44 M $NH_4Br$ dissolve 0.427 M AgBr/L; 3.39 M KI dissolve 1.11 M AgI/L; while 3.26 M KSCN dissolve 1.33 M AgSCN/L. At higher $SCN^-$ concentrations, however, double salts precipitate out, so for very high Ag concentrations, the iodides are the best solvents. At these high concentrations, the cation effect is diminished, and HI is almost as good a solvent as KI. One case where the weaker solvent $Br^-$ might be favored over the other two ligands is where a larger volume is desired because of the small quantity of metal in a large volume (as mentioned above.) Silver bromide may be converted to the iodide with ease. AgBr may be, inter alia, recycled for further photographic use (see, e.g., U.S. Pat. No. 3,600,175 and Brit. Pat. No. 1205395). The factors of temperature and cation identity have been mentioned above, and are additional variables which may be used to enhance the versatility of the method. The effect of ionic strength on the solubility of the complex in the *diluted* reagent must be considered, because, at a reagent concentration of about 1 M, increased ionic strength, because of additional salts, etc., as mentioned, will always raise the solubility of the complex. Although $CN^-$ salts, classed as "pseudohalides," form very strong complexes with silver, they are "linear" solvents in that, as opposed to $Br^-$, $I^-$, and $SCN^-$, the $CN^-$ salts form strong ionic complexes of the type $M(CN)_2^-$, which, according to the Law of Mass Action, has a concentration proportional to the first power of the $CN^-$ concentration; $S_2O_3^=$ also dissolves these metal thiosulfates in an almost linear manner, for, although there is formation of the series of polynuclear complexes of the general formula

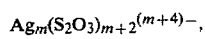

$$Ag_m(S_2O_3)_{m+2}^{(m+4)-},$$

there is a large amount of the "linear" complex $Ag(S_2O_3)_2^{-3}$ (Arkiv Kemi, 12, 229.)

Therefore, reasonable dilution would not precipitate enough of the dissolved salt.

The neutral ligand $NH_3$ in water solution dissolves many Ag salts, and in a non-linear way. $NH_3$ is used in leaching Cu from ores. It also figures in a Hungarian Patent (by J. and J. Kovacs) (CA 78, P60867h) for the recovery of Ag from photographic wastes. However, its solvent properties for these metals salts is in the cold (0° C.), at high $NH_3$ concentrations. There is no immediately usable product; it is difficult to handle concentrated $NH_3$ solutions; there is the danger of the formation of explosive compounds with Ag. Therefore, the ligands mentioned in my process are preferred.

The combination of ligand and cation should give a salt which is stable at all concentrations, in slightly alkaline media, upon heating, if this is employed (e.g., with bromides), and with the components of the material from which the metal is being recovered. It is useful that there be a relatively big difference between the solubility of this salt, and that formed by neutralization of the acid used for "acid curing," to facilitate fractional crystallization. E.g., there is a big difference in solubility between KI and $K_2SO_4$, the latter dissolving to a small extent in concentrated solutions of the former.

If the same volume (minimum covering volume) of $H_2SO_4$ is used as that of $HNO_3$, the amount of neutralizing base must be double, and the relative addition of the ionic strength will be 6 times as much, since $SO_4=$ is doubly charged.

If $HNO_3$ is used, the fumes of $NO_2$ may be absorbed in urea. The heat of neutralization may of course be taken advantage of to warm the added reagent (e.g., a bromide), to increase the solubility.

It should be noted that, in the acid treatment of some wastes, the presence of some halide, along with the acid, while increasing the corrosiveness of the mixture to the reaction vessel, will have a rate-increasing effect on the reaction.

Following are embodiments of the proposed process as given in Working Examples; they should not limit the scope of this process either as to concentrations; possible combinations of ligand, cation; form and source of silver; acid used; etc. E.g., a column extraction of the metal by reagent may be used. A third wash may be introduced. Etc.

WORKING EXAMPLES

EXAMPLE 1

500 g of ash, with a 10% Ag content, from the burning of a contrasty single-weight paper, medium speed B&W film, waste emulsion, and a small amount of metallic Ag leached from exposed film by means known in the Art were soaked with $H_2O$ to remove salts (soluble), and the wash removed by vacuum filtration. The waste was wetted by the minimum amount of $H_2SO_4$ (conc., tech.), heated to 90° C. for 10 min., and cooled. KOH was added to neutralize excess acid, and 1.34 L sat. KBr at 60° C.+0.74 M solid KBr were added, the mixture agitated, and vacuum filtered. The remaining material was washed with 250 ml 3.33 M KBr, and the latter filtered also. A final $H_2O$ wash of 1.62 L was used, and this also filtered. The filtrates were combined, whereupon AgBr precipitated, and was separated by filtration.

Yield as Ag=49.5 g, or 99%, including 5.25 g remaining in solution.

EXAMPLE 2

166 g ash from processed industrial x-ray film, with an Ag content of 30% was treated as in Ex. 1, except that the acid was $HNO_3$ (conc., tech.), the neutralizing base was KOH, the halide solution was 76 ml sat. KI at 30° C.+0.76 M solid KI; the first wash was 55 ml 0.40 M KI; and the final wash was 0.93 L $H_2O$.

Yield as Ag=49.4 g, or 98.8%, including Ag in solution.

EXAMPLE 3

200 g of a 50% photographic ash was treated as in Ex. 2 except that the reagent was 188 ml sat. $NH_4SCN$ at 25° C.+0.69 M $NH_4SCN$ (solid); the first wash was 50 ml 0.32 M $NH_4SCN$; and the final $H_2O$ wash was 3.97 L. (The neutralizing base was $NH_4OH$.)

Yield as Ag=99.4 g, or 99.4%, including Ag in solution.

EXAMPLE 4

1 kg of a voluminous ash with a Ag content of 5%, which was obtained by the burning of a mixture of film framed in cardboard, and of copying paper was treated as above, except that the acid used was $H_2SO_4$ (conc., tech.); the base was CaO, the reagent 0.6 L of sat. $CaBr_2$ at 60° C.; the first wash 0.73 L 1.52 M $CaBr_2$; and the final water wash 1.29 L. The treatment was as above. The solid which remained after the filtration of the washes was saved to ascertain whether its $CaSO_4$ content might endow it with useful properties.

Yield as Ag=49 g, or 98%, including Ag in solution.

EXAMPLE 5

8.8 m² of unexposed waste industrial x-ray film with a thickness of 0.1 mm, containing 73.4 g Ag were shredded and the shreds rinsed with water in a container, and the water removed as thoroughly as possible by vacuum. 1 L 3.59 M $NH_4I$ was added to the container, and the mixture was stirred for 10 min. The solution was removed as completely as possible with the aid of vacuum. 1 L wash of 0.57 M $NH_4I$ was added, removed as completely as possible with the aid of vacuum, and a second $H_2O$ wash of 3.27 L added and removed as above. The filtrates were combined, when AgI precipitated and was separated by filtering.

Yield as Ag=73.1 g, or 99.6%, including Ag in solution.

EXAMPLE 6

11.3 m² unexposed waste color negative film with a thickness of 0.1 mm and containing 24.8 g Ag were shredded and washed as in Ex. 5, and divided into two equal batches. Each batch was treated in turn, as above, with 705 ml 3.05 M NaI; in turn with a first wash of 0.5 M NaI of the same volume; and then, in turn, with a $H_2O$ wash of 750 ml.

Yield as Ag=24.6 g, or 99%, including Ag in solution.

EXAMPLE 7 22.5 m² double weight unexposed waste low-contrast photographic paper with a thickness of 0.28 mm was divided into 9 equal batches consisting of 1×1 dm² cards. The total Ag content was 24.8 g. The batches were treated as in Exs. 5–6, except that reagent was 876 ml $NH_4Br$, sat. at 25° C.; the first wash the same volume of 2.0 M $NH_4Br$; and the $H_2O$ wash 860 ml.

Yield as Ag=24.3 g, or 98.2%, (including Ag in solution.

Notes: (a) the photographic film (exposed) was burned as completely as possible to avoid reaction of cellulose compounds with $HNO_3$ to form nitrocellulose; (b) safe-light conditions were used where applicable.

I claim:

1. A process for the recovery of silver as silver halide or silver pseudohalide from waste photographic paper, photographic film and other sensitized materials which comprises washing the material, removing wash, bringing the silver present to a form solubilizable in concentrated halide or pseudohalide solution by oxidation if necessary, dissolving the silver salt or salts by means of a concentrated reagent solution of the halide or pseudohalide of an alkali or alkaline-earth metal, or ammonium, separating said complex solution from solid matter, washing the solid in turn with a dilute solution of the halide or pseudohalide, and then with water, treating said separated complex solution with said dilute halide or pseudohalide wash and wash water combined to form a precipitate, and separating the precipitate of said silver halide or pseudohalide, reconcentrating dilute reagent, separating unwanted accumulated salts from reagent and purifying said silver salt.

2. A process according to claim 1 wherein the silver is already in the form of a salt dispersed in the material which is directly treated with said concentrated solution of reagent.

3. A process according to claim 1 wherein said oxidation is effected by an acid which is neutralized by a base having the same cation as the reagent.

4. A process according to claim 3 wherein the acid is $H_2SO_4$ and the base is CaO or KOH.

5. A process according to claim 1 wherein the material is first burned, and then treated in turn with acid, base, and reagent, and the solution filtered.

6. A process according to claim 1 wherein the halide reagent is an iodide or bromide.

7. A process according to claim 1 wherein the pseudohalide is a thiocyanate.

8. A process according to claim 1 wherein the reagent cation is a metal ion such as of K, Na, Li, or Ca, or the $NH_4^+$ ion.

9. A process according to claim 1, wherein the complexing reagent is a concentrated solution of one of the compounds KI, NaI, $NH_4I$, KBr, $CaBr_2$, $NH_4Br$, or $NH_4(SCN)$.

10. A process according to claim 1, wherein the acid is a solution of $H_2SO_4$ or $HNO_3$.

11. A process according to claim 1, wherein the metal-containing complex solution is passed through activated charcoal before dilution.

12. A process according to claim 1, wherein the complex solution or other liquids are separated from solid matter by vacuum filtration or centrifugation.

13. A process according to claim 1, wherein the reagent, after treating a certain quantity of silver-containing material, is separated from unwanted salts by fractional crystallization.

14. A process according to claim 1, wherein the volume of the reagent used is determined, for small-volume materials, by the maximum usable concentration of reagent, and for large-volume materials by the volume of the material.

15. A process according to claim 14 wherein the maximum usable concentration is that concentration where the change in complex solubility of the silver salt with respect to a change in reagent concentration, at the prevailing solution conditions, is still hyperlinear, or, the saturation or supersaturation point of the reagent, whichever concentration is less.

16. A process according to claim 1 wherein the volume of the first wash is always determined by the volume of the material, and the reagent concentration therein by the retained silver-complex concentration.

17. A process according to claim 1, wherein the water-wash volume is determined by the desired final reagent concentration in the combined filtrates, as determined by the allowed final silver-complex concentration in said filtrate combination.

18. A process according to claim 1 wherein the final silver-complex concentration is determined by the optimum trade-off between final reagent volume, which must be partially evaporated, and the solvent power of reagent already containing an amount of dissolved complex.

19. A process according to claim 1 wherein the silver remaining in complex solution in the diluted reagent is removed by passing through a chromatographic column.

20. A process according to claim 1 wherein the diluted reagent is reconcentrated by evaporation.

21. A process according to claim 1 wherein the recovered silver salt is further purified by redissolving in pure reagent, the resulting solution filtered, diluted with pure water, and the pure silver salt recovered.

* * * * *